July 18, 1950 H. G. HUGHEY 2,515,301
GAS TORCH
Filed Aug. 10, 1945

INVENTOR
HOWARD G. HUGHEY
BY
ATTORNEYS

Patented July 18, 1950

2,515,301

UNITED STATES PATENT OFFICE 2,515,301

GAS TORCH

Howard G. Hughey, Fanwood, N. J., assignor to Air Reduction Company, Incorporated, a corporation of New York Application August 10, 1945, Serial No. 609,968

1 Claim. (Cl. 266—23)

This invention relates to improvements in gas torches having a tip of the elongated block type in which a longitudinal row of jet passages is supplied with gas from a common longitudinal distributing chamber.

Torches of this type are used in scarfing, flame hardening and similar operations. Scarfing is performed on blooms, billets, slabs or other metal workpieces, to remove a layer of the surface metal and thereby remove the surface imperfections before the final rolling operations. When a torch having a tip of the block type is used for this purpose the jet passages project a row of scarfing oxygen jets against the surface of the work while the metal is at kindling temperature to progressively remove the surface metal by thermochemical action when the torch tip and the surface to be scarfed are moved relatively to each other.

Sometimes the same scarfing apparatus is used at different times on billets or other work-pieces of different widths. The torch tips are made wide enough to direct oxygen against the entire width of the widest work-piece for which the apparatus is designed. Therefore, when the apparatus is used to scarf a billet of less width, the oxygen which issues from the excess jet passages is wasted unless the operator stops the delivery of oxygen by them which he usually fails to do.

The principal object of this invention is to provide an improved torch for scarfing and similar operations having means for automatically changing the number of active jet passages in the torch tip in accordance with the width of the work being scarfed or otherwise operated upon by the torch.

According to the invention a work-engaging device is attached to one end of the torch tip, and when the torch tip is positioned to operate on a billet or other work-piece, say its top face, this work-engaging device engages one side face of the work-piece and properly locates its end of the torch tip with respect to the corresponding edge of the work. A second work-engaging device, which is yieldingly urged inwardly, is adapted to engage the opposite or second side face of the work-piece and is attached to a piston valve slidably mounted in the longitudinal bore which constitutes the distributing chamber for the row of jet passages. This second work-engaging device moves inwardly until it engages the second side face of the work-piece and thereby moves the piston valve into the distributing chamber the proper distance to block off all of the jet passages at the corresponding end of the torch tip which are in excess of those needed in the treatment of the particular work-piece being operated upon.

The accompanying drawing illustrates several embodiments of the invention as applied to the torch tip of a billet scarfing apparatus. In the drawing.

Figure 1:
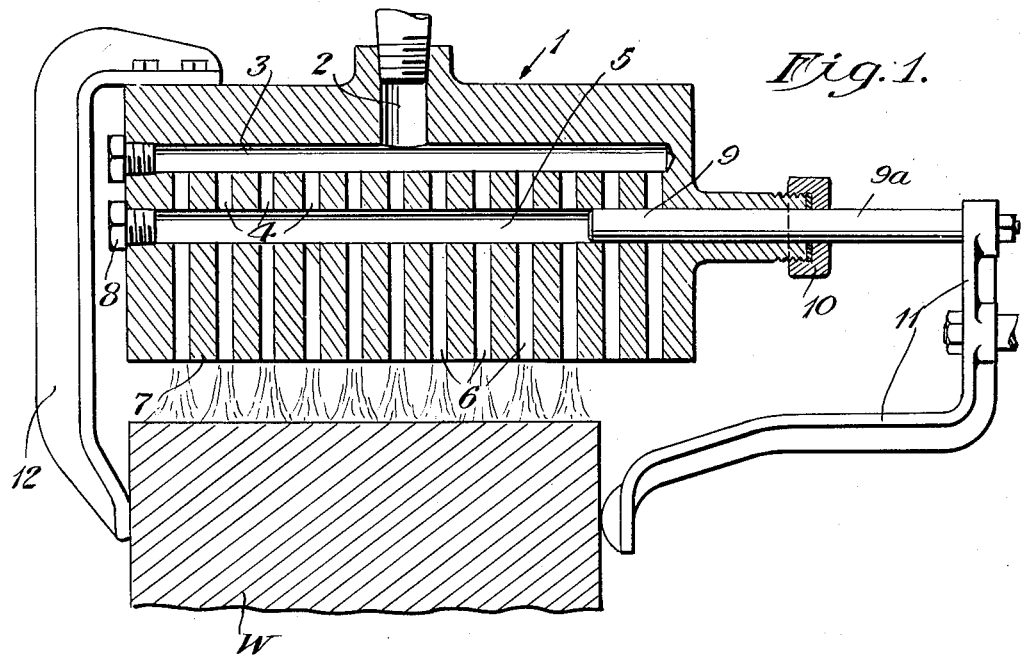
Figure 1 is a more or less diagrammatic representation, in vertical section, of the torch tip and shows the above-mentioned valve and its attached work-engaging device in elevation.

Referring first to Fig. 1, the torch tip is represented at 1. It is of the elongated block type, and when positioned in operative relation to a work-piece W, the longitudinal axis of the tip extends transversely across the face of the work-piece to be operated upon. In the drawing the torch tip is shown positioned for operating upon the top horizontal face of the work-piece. During the scarfing or heat-treating operation the torch tip and work-piece are moved relatively to each other, the direction of relative movement being at right angles to the longitudinal axis of the torch tip.

Gas enters the torch tip through an inlet passage 2 and passes into a manifold or distributing chamber 3 formed by a longitudinal bore in the tip. The gas then passes through a series of passages 4 into a second distributing chamber 5 formed by another longitudinal bore in the tip. The distributing chamber 5 distributes the gas to a number of jet passages 6 which lead to the discharge face 7 of the tip. If the torch is intended for heat-treating operations, such as flame hardening, the gas supplied to the tip may be a combustible mixture of oxygen and a fuel gas such as acetylene. The gas mixture issues from the discharge orifices at the ends of the jet passages and feeds flame jets which are directed against the face of the work-piece in a manner well understood in the art. If the torch is intended for scarfing, the gas introduced at the inlet passage 2 is oxygen, and the jet passages then project streams of scarfing oxygen against the work surface while the metal is at kindling temperature. It will be understood, however, that for scarfing purposes the jet passages 6 direct the streams of scarfing oxygen forwardly and at an angle to the work surface, in accordance with conventional practice, and not normal to the work surface, as would appear from the diagrammatic representation of the torch tip in Fig. 1. The metal may be brought to kindling temperature for scarfing purposes by one or more rows of preheating flames fed by a combustible gas mixture through the usual passages which are not shown in the drawing.

One end of the distributing chamber 5 is closed by means of a plug 8 and a cylindrical piston valve 9 slides in the other end of the distributing chamber. The valve has a stem portion 9a which extends outside of the torch tip, a stuffing box 10 being provided through which this portion of the valve passes. The stem portion 9a of the valve is attached to a gauge or work-engaging device 11 the end of which is adapted to engage one of the two side faces of the work-piece that are contiguous to the work face to be operated upon by the torch. The end of the torch tip opposite its valve end has attached to it a second work-engaging device 12 the end of which is adapted to engage with the other of the two faces that are contiguous to the work face to be operated upon.

Figure 2:
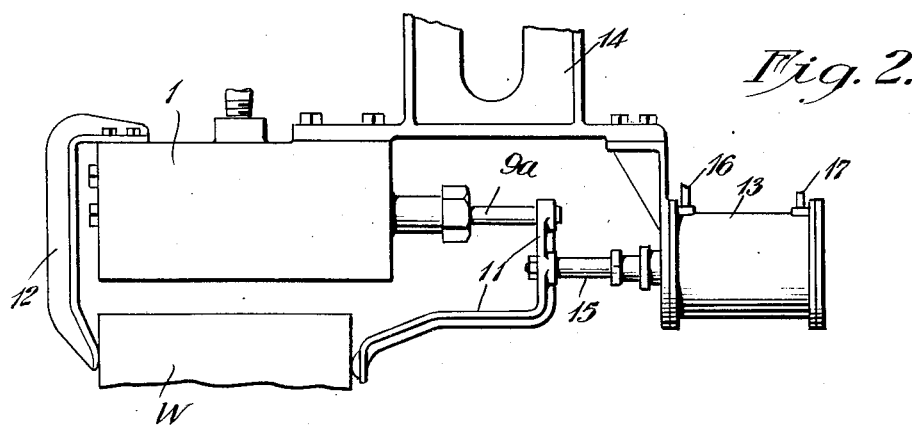
Fig. 2 shows in elevation the parts illustrated in Fig. 1 plus one type of means for yieldingly urging the work-engaging device of the valve into contact with the corresponding side face of the billet.

The work-engaging device 11 is yieldingly urged toward the adjacent side face of the work-piece in any suitable way, as by means of a fluid motor such as that shown at 13 in Fig. 2. The fluid motor may be carried by the same supporting structure 14 that supports the torch tip 1. The piston rod 15 of the fluid motor is connected to some part of the work-engaging device 11, as shown. Motive fluid may be admitted to and discharged from the cylinder of the fluid motor through pipes 16 and 17, and the supply of fluid to and its exhaust from the motor cylinder may be controlled by valve mechanism of any suitable type not shown in the drawing.

When initially positioning the torch tip in operative relation to the work-piece to be operated upon, motive fluid is admitted to the rod end of the cylinder of the fluid motor to retract the work-engaging device 11, and the torch tip is then so positioned relative to the work-piece that the work-engaging device 12 contacts the left side face of the work-piece, as viewed in the drawing. This work-engaging device is adapted, when in contact with its side of the work-piece, to properly locate the left end of the torch tip with respect to the surface to be operated upon. Motive fluid is then admitted to the piston end of the motor cylinder and the work-engaging device 11 is thereby moved inwardly until it contacts with the right side of the work-piece as viewed in the drawing. The valve 9 moves with the work-engaging device and shuts off communication between the distributing chamber 5 and all those jet passages 6 at the right end of the torch tip which are not needed in operating upon the particular work-piece being treated. In Fig. 1 the work-piece W is of such a width that two of the jet passages at the right end of the torch tip are not needed, and for this width work-piece the valve blocks off these two jet passages, as shown, and thereby prevents useless delivery of gas by them.

Figure 3:
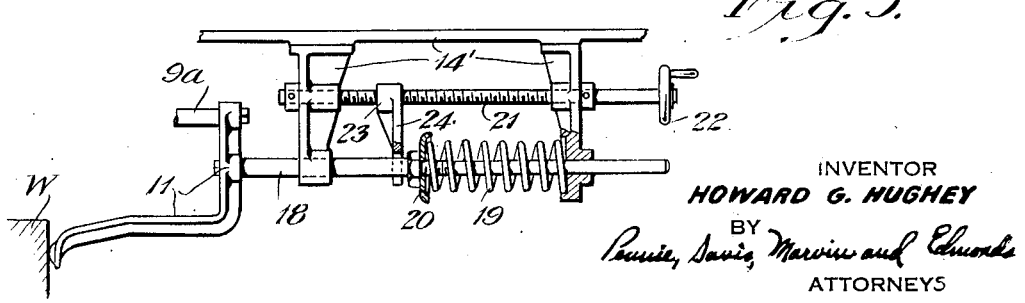
Fig. 3 shows in elevation a modified form of means for yieldingly urging the work-engaging device of the valve into contact with the side face of the billet.

Fig. 3 shows a modified form of means for yieldingly urging the work-engaging device 11 into contact with the side face of the work-piece. In this modification the work-engaging device is connected to a rod 18 which slides in the same structure 14' that supports the torch tip. A coil spring 19 surrounds the rod 18 and reacts at one end against a portion of the structure 14' and at its other end against a plate 20 secured to the rod 18. Thus, the spring 19 yieldingly urges the work-engaging device 11 toward the corresponding side of the work-piece. To retract the work-engaging device 11 to permit the torch tip to be initially positioned there is provided a lead screw 21 rotatably mounted in the structure 14' and provided with a hand wheel 22. The lead screw has threaded engagement with a sleeve 23 carrying a downwardly extending arm 24 whose lower end is apertured or bifurcated to provide an opening through which the rod 18 passes. When the handwheel 22 is turned in one direction the arm 24 is moved to the right along the lead screw to compress the spring 19 and withdraw the work-engaging device 11 from the work-piece, and when the hand wheel is turned in the opposite direction the arm 24 is moved away from the spring to release it and allow the spring to yieldingly press the work-engaging device into contact with the side face of the work-piece.

It will now be seen that the invention provides means for automatically changing the number of active jet passages in accordance with the width of the work-piece to be operated upon. If the work-piece is a bloom or billet and the torch is used for scarfing it, the position of the valve in the distributing chamber 5 is automatically adjusted by its work-engaging device to shut off the supply of scarfing oxygen to all of the jet passages at the right end of the torch tip which are not needed to scarf the particular billet to be operated upon. If the work-piece is some metal object to be flame hardened or otherwise heat-treated and the torch is a heating torch, the position of the valve in the distributing chamber is similarly automatically adjusted by its work-engaging device to block off the jet passages at the right end of the torch tip which are not needed in heat-treating the particular work-piece to be operated upon. The torch tip is made wide enough to direct scarfing oxygen or heating flames against the entire width of the widest work-piece for which the apparatus is designed, and when a work-piece of this maximum width is being operated upon, of course none of the jet passages at the right end of the torch tip will be blocked off by the valve, but for narrower work-pieces the valve will automatically block off those jet passages which are not needed, thereby saving the gas which would otherwise be discharged through them. If the work-piece is of uniform width throughout its entire length, the number of jet passages that are blocked off by the valve during a scarfing or heat-treating operation will remain constant, but should the work-piece vary in width along its length the position of the valve in the distributing chamber would be automatically adjusted during the movement of the torch tip lengthwise of the work-piece to vary the number of active jet passages as the width of the work-piece varies.

I claim:

A gas torch for use in scarfing or otherwise operating on billets or other metal work-pieces, comprising a tip of the block type, means mounted on the torch for positioning one side of the tip with respect to the face of the work-piece to be operated upon, a work-engaging device at the opposite side of the tip having a portion thereof adapted to contact a face of the work-piece adjacent the face to be operated upon, a gas distributing chamber within said tip extending lengthwise between said sides of the tip, gas passage means extending from the gas distributing chamber and terminating at the discharge face of the tip, means for supplying gas to said distributing chamber and a reciprocating plunger valve movable within the distributing chamber to selectively block off said gas passage means progressively from the second to the first mentioned sides of the tip and to progressively reestablish the gas passage means, said valve having a stem portion extending outside the torch tip, said stem portion being so carried by and fixedly connected to the work-engaging device for movement therewith that movement of the work-engaging device toward the torch tip positioning means causes the valve to progressively block off the gas passage means and movement of the work-engaging device away from the torch tip positioning means causes the valve to progressively reestablish the gas passage means, whereby the extent to which the gas passage means is blocked off is determined by the spacing of the work-engaging device from the torch tip positioning means.

HOWARD G. HUGHEY.

REFERENCES CITED

The following references are of record in the file of this patent:

UNITED STATES PATENTS

| Number | Name | Date |
|---|---|---|
| 2,102,040 | Slade | Dec. 14, 1937 |
| 2,186,096 | Bucknam | Jan. 9, 1940 |
| 2,199,951 | Gorman | May 7, 1940 |
| 2,228,114 | Hess | Jan. 7, 1941 |
| 2,257,605 | Hartley | Sept. 30, 1941 |
| 2,309,128 | McGuire, Jr. | Jan. 26, 1943 |
| 2,392,806 | Bucknam et al. | Jan. 15, 1946 |
| 2,447,081 | Miller et al. | Aug. 17, 1948 |

FOREIGN PATENTS

| Number | Country | Date |
|---|---|---|
| 251,091 | Great Britain | Apr. 29, 1926 |